United States Patent [19]

Alt

[11] 4,332,683
[45] Jun. 1, 1982

[54] ADJUSTABLE AND STATIONARY HOLDING APPARATUS FOR A SWIMMING POOL SURFACE SKIM NET

[76] Inventor: William P. Alt, 1331 Stanley St., Longwood, Fla. 32750

[21] Appl. No.: 259,948

[22] Filed: May 4, 1981

Related U.S. Application Data

[63] Continuation-in-part of Ser. No. 171,883, Jul. 24, 1980, abandoned.

[51] Int. Cl.³ .............................................. B01D 35/28
[52] U.S. Cl. .................................................... 210/499
[58] Field of Search ...................... 210/169, 242.3, 483, 210/499; 15/1.7; 248/94, 95; 211/182

[56] References Cited

U.S. PATENT DOCUMENTS

| | | | |
|---|---|---|---|
| 58,112 | 6/1921 | Schaumberg | 248/94 |
| 1,424,387 | 8/1922 | Wills | 248/94 |
| 2,913,249 | 11/1959 | Welsh | 211/182 |
| 3,139,987 | 7/1964 | Pubio et al. | 211/182 |
| 3,774,767 | 11/1973 | Field | 210/169 |
| 3,814,150 | 6/1974 | Gower | 248/94 |
| 3,814,359 | 6/1974 | Powell | 248/95 |
| 4,053,412 | 10/1971 | Stix | 210/169 |
| 4,089,074 | 5/1978 | Sermons | 210/169 |
| 4,140,634 | 2/1979 | Harry | 210/169 |
| 4,152,801 | 5/1979 | Lieber | 210/169 |

Primary Examiner—Ivars C. Cintins
Attorney, Agent, or Firm—Duckworth, Allen, Dyer & Pettis

[57] ABSTRACT

An adjustable and stationary holding apparatus for a swimming pool surface skim net is disclosed comprising an elongated hollow main member provided with at least one hole at the top surface and coupled to at least one support foot member for support. The elongated hollow main member is connected to a skim net holding member to which the skim net is displaceably coupled. A skim net support member is coupled to the skim net to maintain the skim net in a fully expanded position.

6 Claims, 4 Drawing Figures

ADJUSTABLE AND STATIONARY HOLDING APPARATUS FOR A SWIMMING POOL SURFACE SKIM NET

This application is a continuation in part of co-pending U.S. patent application Ser. No. 171,883, filed on July 24, 1980, now abandoned.

BACKGROUND OF THE INVENTION

This invention relates to skim nets for swimming pools generally, and more particularly to an ajustable and stationary holding apparatus for a swimming pool surface skim net.

Numerous devices for skimming debris from pool water have been described in the prior art. One such device is described in U.S. Pat. No. 3,774,767 (Field, Nov. 27, 1973). The device described in that patent provides for a mean to direct floating debris into the swimming pool skimmer. The debris is actually collected in the conventional pool skimmer. In addition, it uses a weight on the pool deck with a cord to the apparatus to position and stabilize the apparatus. This device has the disadvantage that it cannot be placed at any angle and at any location on the pool edge.

Another device, for example the one described in U.S. Pat. No. 4,053,412 (Stix, Oct. 11, 1977), is used to collect debris from the swimming pool and has a removable net. The device uses a floating support frame, together with an anchor, pool deck weights, cords or ropes to position and stabilize the device in the pool. This device has the disadvantage of being bulky and difficult to remove and install with its many different parts.

Another device, the one described in U.S. Pat. No. 4,089,074 (Sermons, May 16, 1978), utilizes a floating member and a screen or net for placement on the water surface to collect debris from the swimming pool. The device has to be anchored by the use of a pool deck weights and cords for proper positioning in the pool. Yet another device described in U.S. Pat. No. 4,140,634 (Harry, Feb. 20, 1979) shields the conventional swimming pool skimmer from the floating debris on the water surface. This device has the disadvantage that it requires attachment to pool walls by means of masonry bolts and/or hooks to secure the skimmer shield. An alternate means of securing is by means of suction cups. This device has the disadvantage that it requires permanent installation in most cases to pool walls and has a number of complex parts.

Another device, the one described in U.S. Pat. No. 4,152,801 (Lieber, May 8, 1979), uses an apparatus for disturbing and collecting the debris from the bottom surface of the swimming pool. This device is a hand-held device requiring manual operation.

BRIEF SUMMARY OF THE INVENTION

One of the disadvantages with all of the devices described prior art is that they are rather complex and bulky and are difficult to install or remove for storage. The disadvantages of these devices are overcome by the adjustable and stationary holding apparatus for a swimming pool surface skim net of the present invention which comprises an hollow main member provided with at least one hole at the top surface, and having connected thereto at least one support foot member. A skim net holding member is coupled to the elongated main member and downwardly disposed to be coupled to a skim net. The skim net includes a coupling member having at least one outwardly biased projection which can engage at least one of a plurality of holes on the skim net holding member, thereby allowing for the vertical adjustment of the skim net. The skim net is also provided with a skim net support member to maintain the skim net in a fully expanded position.

BRIEF DESCRIPTION OF THE DRAWINGS

Further details are explained below with the help of the examples illustrated in the attached drawings in which.

DETAILED DESCRIPTION OF THE PREFERRED EMBODIMENTS

Figure 1:
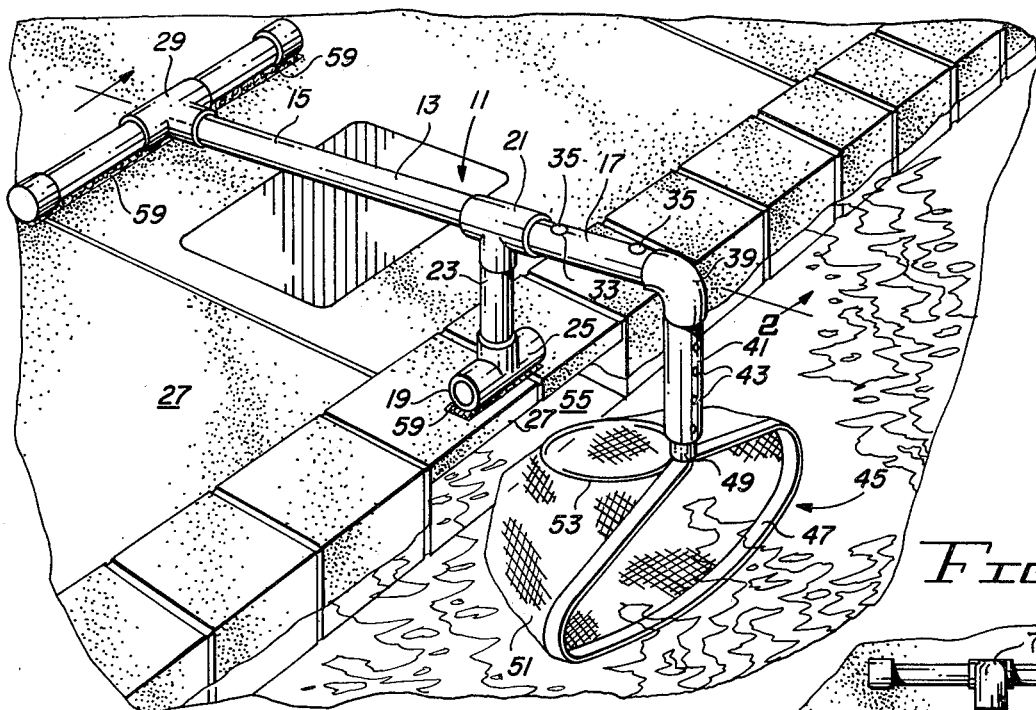
FIG. 1 is a top perspective view of one of the embodiments of the invention.
Figure 2:
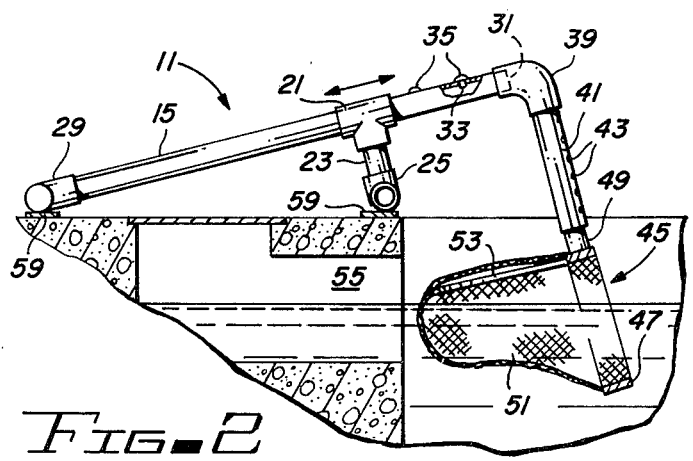
FIG. 2 is a side view of the embodiment of FIG. 1.

Illustrated in FIGS. 1 and 2 is an adjustable and stationary holding apparatus for a swimming pool surface skim net 11 according to the present invention. The holding apparatus 11 includes an elongated hollow central member 13 which may be made of two separate lengths of PVC pipes 15 and 17. The holding apparatus 11 also includes at least one support foot member 19 which may comprise a T-joint 21 coupled to a short length of PVC pipe 23, which is further coupled to a second T-joint 25. The second T-joint 25 rests upon the edge of a swimming pool deck 27. One end of the elongated central member 13 may be provided with a third PVC T-joint 29 which may serve as additional footing. The T-joint 29 may be plugged at the ends or may be provided with short lengths of PVC pipe which are capped at the ends. The elongated central member is also provided with a stop 31 at one end so as to make the interior portion of the elongated central member 13, which is made of PVC pipe, substantially leak-proof. The central member 13 may be alternatively a single length of PVC pipe, in which case T-joint 21 is designed to slide with respect to central member 13. In that configuration the holding member 11 may be adjusted by sliding T-joint 21. At least one hole 33 is drilled on elongated central member 13 and is provided with a plug or cap 35. The hole 33 provides a means for filling the interior portion of elongated central member 13 with water so as to stabilize the holding apparatus 11. The upper end of elongated central member 13 is fitted with an L-shaped (elbow) joint 39. A skim net holding member 41 and is secured to the L-joint 39. The holding member 41 is preferably made of PVC pipe, and is provided with a plurality of holes 43. A skim net 45 comprising a skim net frame 47, connected to a skim net holding pole 49 and to net material 51 is also provided. The skim net holding pole 49 is provided with biased projecting means (not shown) adapted to engage holes 43 so that the skim net 45 may be secured to the holding member 41 at various positions. The biased projecting means may be a protruding button connected to a leaf spring on the inside of holding member 41. A skim net support member 53 is provided to maintain the net material 51 in a fully expanded deployment. The skim net support member 53 may be a single rod of semi flexible plastic that is looped and secured to the skim net frame 47. The holding apparatus 11 may be preferably disposed in front of the conventional pool skimmer 55 of the filtering system of the pool or any location on the pool edge so that the net material 51 will create a natural trap for any flowing debris.

The holding apparatus 11 may also be provided with velcro strips 59 to ensure against accidental displacement of the skimming net.

Figure 3:
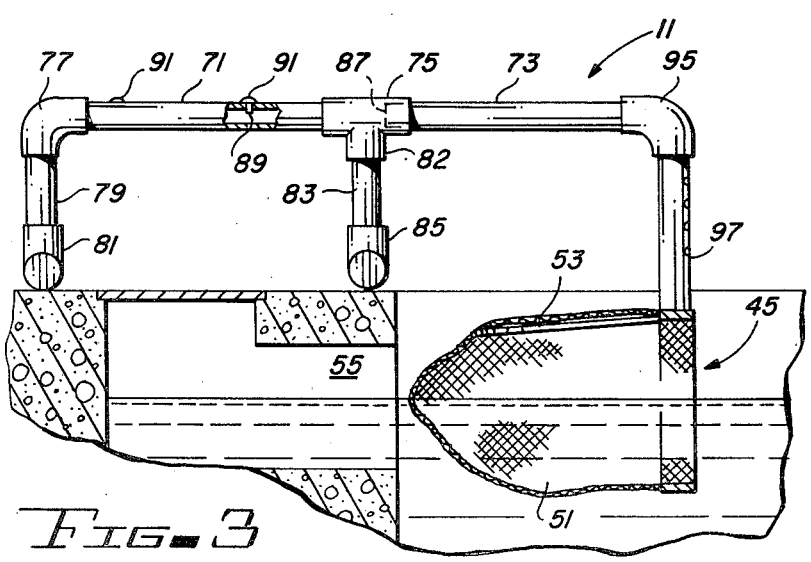
FIG. 3 is a side view of an alternate embodiment of the invention.

As illustrated in FIG. 3, an alternate embodiment of the holding apparatus 11 may comprise a pair of elongated pipe lengths 71 and 73 coupled together by a T-joint 75. One end of pipe 71 is coupled to an elbow joint 77 which is in turn secured to a length of pipe 79 and subsequently to T-joint 81. The T-joint 81 may be plugged at the ends of may be alternatively provided with short lengths of PVC pipe which are capped at the ends. The base portion 82 of T-joint 75 is secured to a length of pipe 83 which is in turn secured to T-joint 85. The T-joint 85 may be plugged at the ends or may be alternatively provided with short lengths of PVC pipe which are capped at the ends. A water stop 87 is provided at the end of pipe 73 which is connected to T-joint 75.

At least one hole 89 is drilled on the upper surface of pipe 71, and is provided with a cap 91. An elbow joint 95 is secured to one end of pipe 73 and is also secured to a holding member 97, which is similar to holding member 41, in the embodiments of FIG. 1. The skim net 45 illustrated in FIG. 2 is similar to that illustrated in FIG. 1. The skim net is 45 also provided with a skim net support member 53 to provide a fully expanded net during operation. As is apparent from FIG. 2, the pipes 71, 83 and 79 provide a closed chamber which may be filled with water through openings or holes 89. By filling the chamber with water a counterweight is provided for any drag or other forces which may be acting upon skim net 45.

Figure 4:
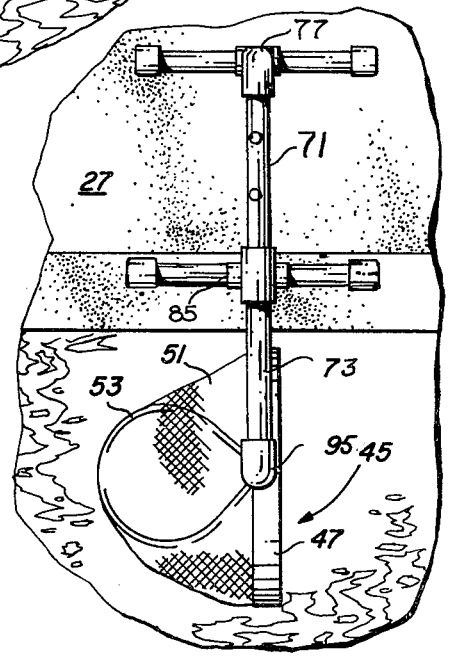
FIG. 4 is a top view of the holding apparatus of the invention of FIG. 3 with the skim net at a 90° angle.

In operation, the holding apparatus 11 of FIG. 1 or FIG. 3 may be placed anywhere along the pool deck. The skim net 45 can be oriented so that the flow of the water helps to trap any debris. For example, skim net 45 may be rotated up to 360° by merely rotating holding member 97 in the embodiments of FIGS. 3 and 4, or in the embodiment of FIGS. 1 and 2 by rotating holding member 41. FIG. 4 illustrates the placement of the holding apparatus 11 with the skim net 45 disposed at a 90° angle, so that it can trap debris flowing substantially parallel to the pool wall. Such flow could take place at a location distant from the conventional pool skimmer 55. When the holding apparatus 11 is to be stored, the water in the pipes may be drained to lighten the weight. In storage, the holding apparatus 11 of the embodiment illustrated in FIGS. 3 and 4 can be disposed with the pipe lengths 71 and 73 in a vertical position and T-joint 81 and elbow joint 77 resting on a floor surface. This results in compact storage of the holding apparatus 11.

I claim:

1. An apparatus for skimming debris from the surface of a swimming pool comprising:
    a hollow main member having a first end and an opposite second end;
    at least one support foot member secured to said main member intermediately between said first and second end, said foot member disposed in a downward direction;
    a hollow support member secured to the second opposite end of said main member and having a downwardly disposed hollow portion;
    a downwardly disposed hollow skim net holding member having a first portion disposed in the hollow portion of the hollow support member and a second portion provided with a plurality of spaced holes;
    a skim net pole having a section adapted to fit inside the skim net holding member;
    biased projecting means disposed on said section of said skim net pole for engaging one of said plurality of spaced holes on said hollow support member;
    a skim net frame secured to said skim net pole;
    netting material secured around the periphery of the skim net frame; and
    means coupled to the skim net frame for maintaining the netting material in a fully expanded position whereby the position of the skim net frame and netting material can be changed by displacing the skim net pole until the biased projecting means engages a second one of said plurality of holes and twisting said holding member relative to said hollow support member.

2. An apparatus in accordance with claim 1 further comprising a second support foot member secured to the first end of said main member.

3. The apparatus of claim 1 or 2 wherein said hollow main member is provided with at least one filling hole, and further comprising at least one cap for filling hole whereby said hollow main member can be filled with material to provide added weight.

4. The apparatus of claim 3 wherein said hollow main member is made of PVC pipe.

5. The apparatus of claim 1 wherein said hollow main member comprises two lengths of PVC pipe, and a T-joint coupling the two pipes, and wherein said at least one support foot member comprises a third PVC pipe coupled to the base of said T-joint; and a second T-joint disposed at the end of said third PVC pipe.

6. The apparatus of claim 1 wherein said means for maintaining comprises a semiflexible plastic rod secured at both ends to the skim net frame.

* * * * *